Figure 1:
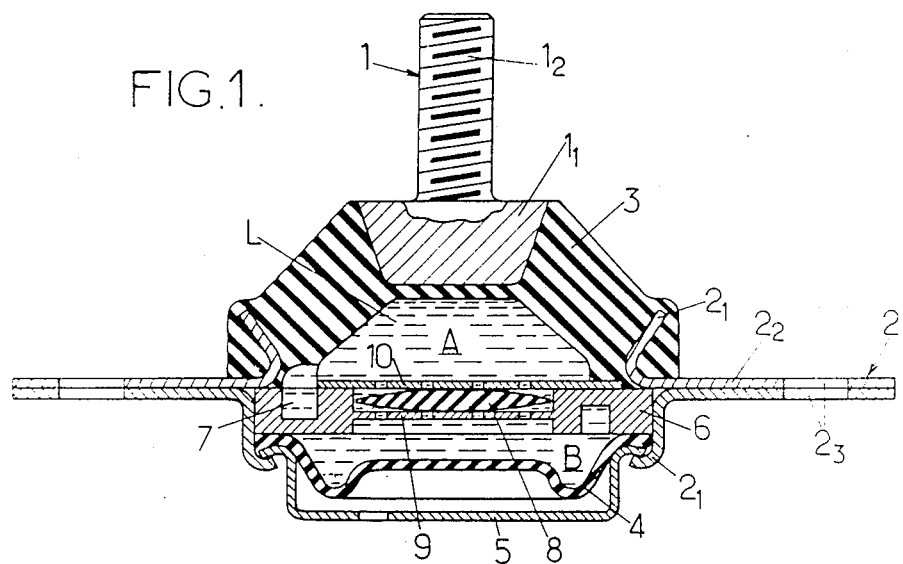

United States Patent [19]
Bellamy et al.

[11] Patent Number: 4,986,510
[45] Date of Patent: Jan. 22, 1991

[54] HYDRAULIC ANTIVIBRATORY DEVICES

[75] Inventors: Alain Bellamy; Ludovic Chauvet, both of Vendome, France

[73] Assignee: Hutchinson, Paris, France

[21] Appl. No.: 363,266

[22] Filed: Jun. 8, 1989

[30] Foreign Application Priority Data

Jun. 9, 1988 [FR] France .............................. 88 07699

[51] Int. Cl.⁵ .............................................. F16F 9/10
[52] U.S. Cl. ................................... 248/562; 248/636; 267/140.1
[58] Field of Search ............... 248/562, 636, 638, 659; 267/140.1

[56] References Cited

U.S. PATENT DOCUMENTS

| | | | |
|---|---|---|---|
| 4,621,795 | 11/1986 | Eberhard et al. | 248/562 X |
| 4,666,137 | 5/1987 | Hamekers et al. | 267/140.1 |
| 4,720,086 | 1/1988 | Le Salver et al. | 248/562 X |
| 4,762,309 | 8/1988 | Hutchins | 248/562 X |

*Primary Examiner*—Alvin C. Chin-Shue
*Attorney, Agent, or Firm*—Larson & Taylor

[57] ABSTRACT

A hydraulic antivibratory device is provided, comprising two rigid frames (1,2); an elastomer body (3) connecting the two frames together and forming two sealed chambers (A, B) at least partially therewith; a restricted passage (7) causing the two chambers to communicate permanently with each other; a liquid mass (L) filling the two chambers and the restricted passage; and a deformable valve (8) partially defining one of the two chambers (A), and mounted between two grids (9, 10). This valve is in the form of a biconvex lens, only the central part of which is in permanent contact with the two grids and is clamped therebetween.

1 Claim, 1 Drawing Sheet

HYDRAULIC ANTIVIBRATORY DEVICES

The invention relates to hydraulic antivibratory devices intended to be positioned, for damping, connecting and even supporting purposes, between two rigid elements such as a vehicle chassis and the engine of this vehicle. It relates more particularly, among such devices, to those which comprise: two rigid frames which can be fixed respectively to the two rigid elements to be joined together, an elastomer body connecting the two frames together and forming at least partially therewith two sealed chambers, a restricted passage permanently causing the two chambers to communicate with each other, a liquid mass filling the two chambers and the restricted passage, and a deformable valve partially defining one of the two chambers, said valve being mounted with possibility of limited deformation between two flat and parallel grids disposed respectively in said chamber and in another chamber, which may be the second of the above two chambers.

As is known, with such a device: the oscillations of relatively high amplitude and relatively low frequency such as those due to the "hash" generated on the vehicle by the bumps in the road result in driving the liquid from one of the two chambers into the other and conversely through the restricted passage, with resonance of the liquid mass thus driven back when the frequency of said oscillations reaches a predetermined value which depends on the ratio between the axial length and the cross section of the restricted passage, such resonance providing excellent damping of the oscillations concerned, the vibrations of relatively small amplitude and relatively high frequency, such as those due to the slow running of the engine, result in vibrations of the valve likely to attenuate the transmission of the vibrations in question.

In known constructions of antivibratory devices of the above kind, the periphery of the deformable valve is clamped between two rigid seats integral with the grids, and it is the central zone of this valve which is subject to the movements of highest amplitude, which movements are limited by abutment of the central zone against the grids. In some cases, the successive applications of said central zone against the grids generate chattering noises. To overcome this drawback, it has already been proposed to form the deformable valve by means of a flat disc with free edge whose centre alone is clamped between two studs forming part respectively of the two grids and projecting towards each other (see Japanese patent No. 62 228726).

This approach again has a number of drawbacks concerning more particularly the risks of punching of the centre of the valve by the studs, the size of the deformations imposed on this valve in the vicinity of the studs, the sudden application of the valve against the grids.

The object of the invention is especially to overcome these different drawbacks. For this, the antivibratory devices of the kind in question according to the invention still comprise a valve adapted and mounted so that only its central zone is permanently in contact with the two flat and parallel grids and is clamped therebetween and they are essentially characterized in that the valve is in the form of a biconvex lens.

Apart from this main arrangement, the invention comprises other arrangements which are preferably used at the same time and which will be more explicitly discussed hereafter.

In what follows, a preferred embodiment of the invention will be described with reference to the accompanying drawings in a way which is of course in no wise limitative.

Figure 2:
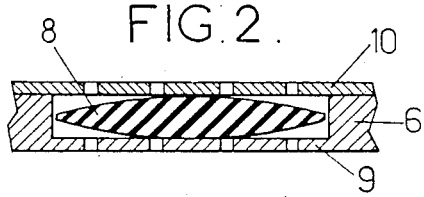
Figure 3:
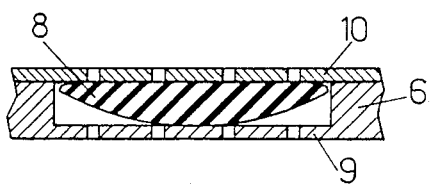

FIG. 1 of these drawings shows in axial section a hydraulic antivibratory support formed in accordance with the invention, FIG. 2 shows in axial section, on a larger scale, the central portion of this support, the valve being shown in its rest position, and FIG. 3 differs only from FIG. 2 in that the valve is shown in one of its two endmost deformed positions.

In a way known per se, the support considered comprises: a rigid base 1 formed by a central plug 11 extended upwardly by a stud bolt $1_2$, a rigid ring 2 formed by two annular plates welded together, each of these plates being defined inwardly by a bent back edge 21 and being extended outwardly by two lugs $2_2$ themselves pierced with fixing holes $2_3$, a thick truncated cone shaped rubber wall 3 having good axial compression resistance so as to play a role of "support" connecting base 1 sealingly to ring 2, a thin and flexible bellows 4 joined sealingly to ring 2 and defining a closed box with this ring, wall 3 and base 1, a rigid cover 5 for protecting the bellows whose periphery is fixed to ring 2, a rigid intermediate dividing wall 6, dividing the box into two chambers, namely a work chamber A on the wall 3 side and a compensation chamber B on the bellows 4 side, a restricted passage 7 connecting the two chambers A and B together, which passage is preferably formed in the rigid periphery of the intermediate dividing wall 6, a liquid mass L filling the two chambers and the restricted passage, and a valve 8 mounted between two flat and parallel perforated grids or plates 9 and 10 forming part of the intermediate dividing wall, this assembly being made so that the amplitude of the axial movements of the different points of the valve are limited to a value less than 1 mm and preferably about 0.5 mm.

The assembly formed by the peripheral areas of the flexible bellows 4, cover 5 and intermediate dividing wall 6 are crimped together by bending back edge $2_1$ forming part of one of the two plates forming ring 2 against the other plate, the edge $2_1$ of this other plate being embedded in the large base of the thick truncated cone shaped wall 3.

The invention concerns more particularly the valve 8.

This valve is made from a deformable, preferably resilient, material: it may for example be an elastomer, reinforced or not by an appropriate fabric.

It is further adapted so that only its central zone is permanently in contact with the grids and clamped or nipped between these grids, the periphery of the valve being floating.

For this, it has the general form of a biconvex lens, each face bulging out with a continuous curvature, advantageously spheric.

In FIG. 2, valve 8 occupies its median rest position whereas, in FIG. 3, it is shown in one of its two endmost deformed positions, in which it is applied along the whole of one of its two transverse faces, then flat, against the opposite grid 10: for said position, the valve closes all the openings of the grid 10 considered, so that any communication is interrupted through grids 9 and 10 between the two chambers A and B.

During operation of the device, the deformations imposed on the valve by the axial reciprocating movements of the liquid due to the oscillations or vibrations to be damped result in applying the valve alternately, in an extremely progressive way, against each of the grids which surround it, in a kind of rolling, and does not suddenly apply a whole area at least of this valve against the facing grid, which reduces and even suppresses the chattering effect and the noise which results therefrom.

As is evident and as it follows from the foregoing, the invention is in no wise limited to those of its modes of application and embodiments which have been more specially considered; it embraces, on the contrary, all variants thereof, particularly: those in which the valve is formed by a convex plate of non circular contour, for example rectangular or square, those where the valve surrounded by its two grids is provided, not on the intermediate dividing wall 6, but in another position on the internal face of the work chamber A, and in particular in the vicinity of base 1, this valve then controlling communication between chamber A and a third chamber (not shown), this third chamber being also deformable and defined for this purpose by a new sealed flexible membrane whose face external to the chamber considered would define an air chamber Possibly Provided with a foam or would communicate with external air, those in which the antivibratory device considered is a sleeve working essentially in a diametrical direction and for which the two rigid frames are tubular, surrounding each other, and preferably of revolution and coaxial at least under load, and those in which the restricted Passage is formed in other Portions of the device than the Periphery of the intermediate dividing wall, particularly through the central zone of the valve itself.

We claim:

1. A hydraulic antivibratory device intended to be interposed between two rigid elements, comprising: two rigid frames (1,2) which can be fixed respectively to the two rigid elements to be joined together; an elastomer body (3) connecting the two frames together and forming two sealed chambers (A, B) at least partially therewith; a restricted passage (7) causing the two chambers to communicate permanently with each other; a liquid mass (L) filling the two chambers and the restricted passage; and a deformable valve (8) in the form of a biconvex lens partially defining one of the two chambers (A), said valve being mounted with a possibility of limited deformation between two flat and parallel grids (9, 10) disposed respectively in said one of the two chambers and in a third chamber and with a central zone of said bicovex lens shaped valve permanently in contact with the two grids and clamped therebetween.

* * * * *